United States Patent [19]
Akkapeddi et al.

[11] Patent Number: 4,843,127
[45] Date of Patent: Jun. 27, 1989

[54] REACTIVE ELASTOMERIC BLOCK CO-OLIGOMER AND LACTAM-BLOCK COPOLYMERS DERIVED THEREFROM

[75] Inventors: Murali K. Akkapeddi, Morris Plains, N.J.; David E. Bradley, Buffalo, N.Y.; Thomas D. Gallagher, deceased, late of Highbridge, N.J., by Karen A. Gallagher, executrix

[73] Assignee: Allied-Signal Inc., Morris Township, Morris County, N.J.

[21] Appl. No.: 725,061

[22] Filed: Apr. 19, 1985

[51] Int. Cl.$^4$ .................. C08L 77/06; C08L 67/02; C08L 81/00
[52] U.S. Cl. .................. 525/183; 525/181; 525/420; 525/421; 525/432; 525/434; 525/437; 525/447; 525/451; 525/474; 528/323
[58] Field of Search ............... 525/183, 420, 921, 432, 525/434, 437, 447, 451, 474

[56] References Cited

U.S. PATENT DOCUMENTS

| | | |
|---|---|---|
| 3,017,391 | 1/1962 | Mottus et al. . |
| 3,366,608 | 1/1968 | Lincoln et al. . |
| 3,862,262 | 1/1975 | Hendrick et al. . |
| 3,944,629 | 3/1976 | Hendrick et al. . |
| 3,993,709 | 11/1976 | Hedrick et al. . |
| 4,017,558 | 4/1977 | Schmidt et al. . |
| 4,031,164 | 6/1977 | Hedrick et al. . |
| 4,034,015 | 7/1977 | Hedrick et al. . |
| 4,336,344 | 6/1982 | Craigie .................. 525/31 |
| 4,400,490 | 8/1983 | Yang .................. 525/408 |
| 4,414,362 | 11/1983 | Lenke et al. . |
| 4,448,904 | 5/1984 | Dominguez et al. . |
| 4,474,900 | 10/1984 | Dominguez et al. . |

Primary Examiner—John C. Bleutge
Assistant Examiner—A. Carrillo
Attorney, Agent, or Firm—Richard A. Negin

[57] ABSTRACT

The present invention includes a reactive elastomeric block co-oligomer; a copolymer containing a lactam, a co-catalyst/coupling agent, and the elastomeric block co-oligomer; and processes to make the block co-oligomer, and the copolymer.

The reactive elastomeric block co-oligomer is the reaction product of a polycarboxylic acid, and a reactive moiety which can include a reactive polyether or a reactive polysulfide.

The block co-oligomer of the present invention has been found to be useful to make a polymer containing lactam monomers, at least one coupling catalyst compound, and the block co-oligomer with the use of a catalyst.

The present invention includes a process of forming the block co-oligomer of a polycarboyxlic acid and a reactive moiety. The reactive moiety can include a reactive polyether of a reactive polysulfide.

The present invention further comprises a process of forming the block co-oligomer, and the process to form the lactam-block co-oligomer copolymer.

9 Claims, No Drawings

REACTIVE ELASTOMERIC BLOCK CO-OLIGOMER AND LACTAM-BLOCK COPOLYMERS DERIVED THEREFROM

BACKGROUND OF THE INVENTION

The present invention is a reactive elastomeric block co-oligomer comonomer and lactam-block co-oligomer copolymers derived therefrom. The present invention includes methods to make the block co-oligomer and the copolymers.

The anionic polymerization of lactams such as caprolactam is known to proceed through the use of two solutions, as for example in U.S. Pat. No. 3,017,391 of Mottus, et al. (1962). The first solution contains molten caprolactam in which is dissolved an alkali metal or alkaline earth metal-containing material which, in situ, causes the formation of a caprolactamyl anion. The active catalyst may thus be lithium or sodium caprolactam or may be bromomagnesium caprolactam or similar ionic compounds. The second solution contains molten caprolactam in which is dissolved a co-catalyst, which in the above patent may be an acyl biscaprolactam such as terephthaloyl bis(caprolactam). Mixing solutions under appropriate temperature conditions causes polymerization to form a polyamide having at some intermediate point in the chain a terephthaloyl moiety between amine ends of polyamide chains, having caprolactamoyl or carboxy end groups and, in most instances, some degree of branching such as at the nitrogen of an amide ligand.

Molded parts can be prepared by reaction injection molding. A reactive mixture containing caprolactam or similar lactam monomers is injected into a mold where the reaction takes place. While such processes may proceed through anionic polymerization using similar catalysts and co-catalysts to those described above, it is generally desired to achieve faster cycle times at higher temperatures and to obtain parts with modified properties, and especially increased impact strength, compared to those prepared by the processes described above.

U.S. Pat. No. 3,366,608 discloses polymerizing caprolactam in the presence in an alkylene catalyst, N,N'-diacyl biscaprolactam and a polyamine containing two or more primary or secondary amine groups per molecule, or a polyol containing two or more hydroxyl groups per molecule. Suitable polyols are indicated to include diethylene glycol, trimethylol propane, and polyglycols such as polyethylene glycol and polypropylene glycol.

U.S. Pat. Nos. 3,862,262; 3,993,709; 3,944,629; 4,034,015; and 4,487,920 disclose many useful polyols which can be polymerized with caprolactam to form lactam-polyol containing polymers. These patents are hereby incorporated by reference.

SUMMARY OF THE INVENTION

The present invention includes a reactive elastomeric block co-oligomer; a copolymer containing a lactam, a co-catalyst/coupling agent, and the elastomeric block co-oligomer; and processes to make the block co-oligomer, and the copolymer.

The reactive elastomeric block co-oligomer is the reaction product of a polycarboxylic acid, and a reactive moiety which can include a reactive polyether or a reactive polysulfide. The reactive polyether can be selected from a hydroxyl terminated polyether, an amine terminated polyether, and an epoxy terminated polyether. The reactive polysulfide can be a thio terminated polysulfide. The block co-oligomer of the present invention can be selected from the group consisting of:

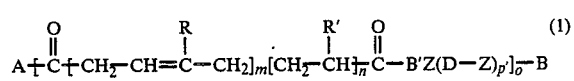

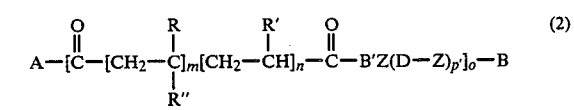

and

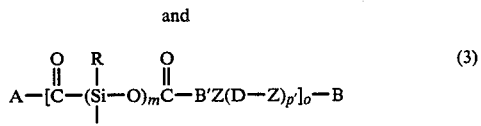

where
A is selected from HD—(Z—D)—$_p$;

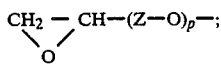

and H$_2$N(Z—O)—$_p$;
B is selected from —DH,

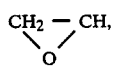

and —NH$_2$;
B' is selected from —D—, —NH, and

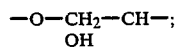

D is selected from —O, and —S;
Z is a divalent group, preferably a hydrocarbon, substituted hydrocarbon, or acylated hydrocarbon group such as —CH$_2$—CH$_2$—; —(CH$_2$)—4; —(CH$_2$)$_6$—; —CF$_2$—CFX—; or —CH$_2$—CR'''H—;
R is selected from —H, —CH$_3$ and —Cl, and a combination thereof;
R' is selected from —CN, —H, a halogen, —CH=CH$_2$ and a combination thereof;
R'' is selected from —CH=CH$_2$, —CH$_3$, and —C$_2$H$_5$ and a combination thereof;
R''' is selected from alkyl groups having 1 to 4 carbon atoms, —CH$_2$Cl, and

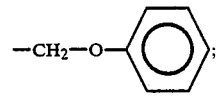

X is —H, —F, —CF$_3$, or —Cl;
m is greater than 10;
n is greater or equal to 0 and less than m;
o is greater or equal to 1; and
p and p' are greater or equal to 5.

The block co-oligomer of the present invention has been found to be useful to make a polymer containing lactam monomers, at least one coupling co-catalyst compound, and the block co-oligomer with the use of a catalyst. The lactam used in the copolymer is preferably epsiloncaprolactam. The preferred coupling co-catalysts include acyl biscaprolactams such as terephthaloyl bis-caprolactam. The catalysts include an alkali metal or alkylene metal containing material which cause the formation of caprolactamyl anions. Preferred catalysts include lithium caprolactam, sodium caprolactam, or bromomagnesium caprolactam.

The present invention includes a process of forming the block co-oligomer of a polycarboxylic acid and a reactive moiety. The reactive moiety can include a reactive polyether or a reactive polysulfide. Preferred reactive moieties can be selected from a hydroxyl terminated polyether commonly known as a polyol, an amine terminated polyether, an epoxy terminated polyether, and thio terminated polysulfide. The polycarboxylic acid can be selected from

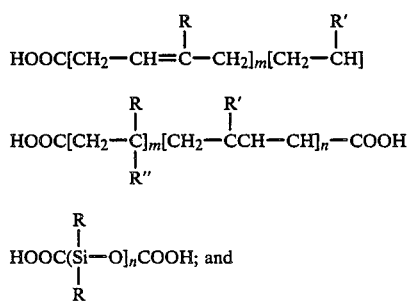

The reactive moiety can be generally represented as $$B'(Z-D)B \qquad (7).$$

The hydroxy terminated polyether is $$HO(Z-O)_pH \qquad (8).$$

The amine terminated polyether is $$H_2N(Z-O)_pZNH_2 \qquad (9).$$

The epoxy terminated polyether is

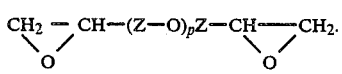
(10)

where D is S, the polycarboxylic acid can react to form a thioester of a thio terminated polysulfide of the formula $$HS(Z-S)_pS \qquad (11).$$

The present invention further comprises a process of forming the block co-oligomer, and the process to form the lactam-block co-oligomer copolymer.

DESCRIPTION OF THE PREFERRED EMBODIMENTS

The present invention is a reactive elastomeric block co-oligomer; a copolymer comprising the block co-oligomer and a lactam; a process to form the block comonomer; and a process to form the lactam-block co-oligomer copolymer.

The block co-oligomers of the present invention are formed from the polycarboxylic acid containing material such as those represented by formulas (4), (5), and (6) and a reactive moiety generally represented by formula (7) which can be selected from a polyol having formula (8), an amine terminated polyether having formula (9), an epoxy terminated polyether having formula (10), or a thio terminated polysulfide having formula (11).

The block co-oligomer of the present invention includes the block co-oligomers having the formulas (1), (2) or (3).

Where the block co-oligomer is represented by formula (1) R is preferably —H, R' is preferably —H or —CN, A is preferably HO—(Z—O)—$_p$, B is preferably —OH, D is preferably —O, Z is preferably derived from propylene or tetramethylene, m is preferably from 10 to 100, and more preferably 20 to 100, n is preferably from 2 to 25 when not zero, o is preferably 1 to 5, p is preferably from 5 to 40, and more preferably 7 to 35, and p' is preferably 5 to 40, and more preferably 7 to 35. The preferred block co-oligomers of formula (1) is a block co-oligomer derived from carboxy terminated polybutadiene or carboxy terminated butadiene acrylonitrile copolymer and polyoxypropylene glycol. The carboxy terminated butadiene acrylonitrile copolymer can have the butadiene and acrylonitrile comonomers in any order including, alternating, block or random order.

Where the block co-oligomer is represented by formula (2) R is preferably H, R" is preferably —CH=CH$_2$ or —C$_2$H$_5$, R' is preferably —H or —CN, A is preferably HO—(Z—O)—$_p$, B is preferably —OH, D is preferably —O, Z is preferably derived from propylene or tetramethylene, m is preferably from 10 to 100, n is preferably from 1 to 20 when not zero, o is preferably 1 to 5, p is preferably from 5 to 40, and more preferably 7 to 35, and p' is preferably 5 to 40, and more preferably 7 to 35. The preferred block co-oligomer of formula (2) is a block co-oligomer derived from carboxy terminated 1,2 polybutadiene or carboxy terminated butadiene acrylonitrile copolymer and polyoxypropylene glycol. The carboxy terminated butadiene acrylonitrile copolymer can have the butadiene and acrylonitrile comonomers in any order including, alternating, block or random order. The 1,2 butadiene can be hydrogenated or chlorinated.

Where the block co-oligomer is represented by formula (3) R is preferably —CH$_3$, A is preferably HO—(-Z—O)—$_p$, B is preferably —OH, Z is preferably derived from propylene or polytetramethylene, m is preferably from 10 to 100, o is preferably 1 to 5, p is preferably from 5 to 40 and more preferably 7 to 35, and p' is preferably 5 to 40, and more preferably 7 to 35. The preferred block co-oligomer of formula (3) is a block co-oligomer derived from carboxy terminated polysilane of formula (3).

The block co-oligomer includes blocks of polycarboxylic acids represented by formulas (4), (5) and (6). The preferred acids are carboxy terminated polybutadiene, 1,2 polybutadiene, hydrogenated 1,2 polybutadiene, chlorinated polybutadiene, and polysilane. The polycarboxylic acids preferably have a number average molecular weight of from 1,000 to 10,000, and more preferably from 2,000 to 5,000.

The preferred material to react with the polycarboxylic acid containing materials are the hydroxyl terminated polyethers known as polyols and represented by formula (8). The preferred polyols include hydroxy terminated polyoxypropylene, polyoxytetramethylene, and polyethylene oxide. The polyols as well as the amine terminated polyethers (formula (9)), epoxy terminated polyethers (formula (10)), and polysulfides (formula (11)) preferably have a number average molecular weight from about 500 to about 10,000 and more preferably 500 to 5,000.

Polyols which can be used to form esters of the polycarboxylic acids include hydroxyl terminated polyethers of formula (8) where Z is a hydrocarbon, substituted hydrocarbon, or acylated hydrocarbon group, which, together with the oxygen atom attached thereto, forms a polyether segment of the polyether molecule.

The Z hydrocarbon, substituted hydrocarbon and acylated hydrocarbon groups can be of any size even polymeric, generally limited to about six carbon atoms, said groups being preferably alkylene, arylene and mixtures thereof. Preferred are aliphatic groups such as methylene, ethylene, propylene and the like. Other suitable Z groups include phenylene, chlorophenylene, tolylene, isobutylene, isopropylene, ethylcarbonyl, propylcarbonyl, ethysulfonyl, propylthiocarbonyl and the like. The Z hydrocarbon can be fluorinated.

Useful polyols include polymeric polyols such as polyethylene glycols, polypropylene glycols, polyoxypropylene diols and triols, castor oils, and polyester glycols, and a large number of compounds containing substituents other than hydroxy groups such as 2,4-dichlorobutylene glycol and 2,2'-4,4'bis (chlorohydroxyphenyl)ether. In addition to all the hydroxy compounds set forth above, thio compounds analogous to the above compounds having sulfur atoms in place of oxygen are also included within the scope of the invention. A few examples include hydroxyethyl thioglycolate, ethylene glycol bis(thioglycolated), pentaerythritol tetrakis(thioglycolate) and thiodiglycol.

The molecular weight of the polyol can be any amount. Commercially available polymeric polyol compounds have molecular weights from 200 to 5000, but polymers with molecular weights outside that range are also useful in the practice of the instant invention.

The block co-oligomer of the present invention preferably has a number average molecular weight of from about 2,000 to about 10,000. The ratio of blocks of the carboxylic acid derived material in the block comonomer to the polyol, amine terminated polyether, epoxy terminated polyether or thio terminated polysulfide, derived material is greater than one and preferably from 1.5 to 10, and more preferably from 1.5 to 4. The most preferred block co-oligomers are derived from the esterification of dicarboxylic acids of polybutadiene, 1,2 polybutadiene, hydrogenated 1,2 polybutadiene, chlorinated polybutadiene, polysiloxane and polypropylene glycol having a molecular weight of from 500 to 2,500.

The block co-oligomer of the present invention has been found to be useful to form an improved copolymer of the type containing lactam monomers; at least one material selected from the polyol, amine terminated polyether, epoxy terminated polyether, thio terminated polysulfide; and a coupling co-catalyst wherein the improvement is the use of the above described block co-oligomer. The copolymer is formed using a lactam polymerization catalyst.

The lactam used in the present invention is preferably a cyclic lactam having the formula:

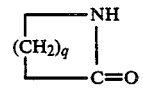

with g being an integer of 3–12.

The lactam monomer and polyol, amine, or epoxy terminated polyether, or thio terminated polysulfide used in the polymerization have been described above.

The coupling co-catalyst used can be any coupling co-catalyst known for use in the anionic polymerization of lactams. Included in useful catalyst coupling agents are polyacyl compounds, polycarbamoyl compounds, triazine compounds, and isocyanates.

Useful polyacyl compounds are discussed in U.S. Pat. No. 4,031,164 hereby incorporated by reference. Polyacyl components in the copolymer can have the following structure:

$$-E-R^{iv}-(E')_y \qquad (12)$$

where $R^{iv}$ is a hydrocarbon group, E and E' are acyl radicals, and y is an integer equal to at least one.

The $R^{iv}$ group can be any hydrocarbon group having at least two valence bonds for attachment to the acyl groups shown in the above formula. Examples include functional groups obtained by the removal of hydrogen atoms from methane, ethane, propane, hexane, dodecane, benzene, toluene, cyclohexane and the like. The polyvalent $R^{iv}$ group can be of any size but is preferably from one to about twenty carbon atoms, and more preferably about eight carbon atoms. If the integer y is one, the linkage will be a diacyl group. The E groups can be any acyl group and preferably are:

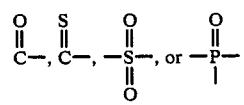

groups. Most preferred among the above groups is the carbonyl group.

Values for the integer y have a direct relationship to the thermoplasticity of the copolymer. If the integer y is greater than one, the linkage will be a higher polyacyl group. The higher the value of y, the finished polymer will be more highly crosslinked. Values for y can be as high as six or eight, but more preferably do not exceed two or three.

Formula (13) sets forth the polyacyl lactams useful herein.

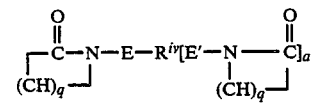

The $R^{iv}$ group can be any hydrocarbon group having the necessary number of available valences to bond itself all of the acyl groups included in the compound. The hydrocarbon group can be of any size but preferably contains a maximum of eight to ten carbon atoms. Examples of suitable $R^{iv}$ groups include phenylene, biphenylene, methylene, hexylene, tolylene, and analogous hydrocarbons having more than two sites available for bonding to acyl groups. The integer a preferably is from one to about three. The E and E' groups can be carbonyl, thiocarbonyl, sulfonyl, or phosphoryl. Preferred among the class of polyacyl lactams included within the scope of the formula given above are those where the E and E' groups are carbonyl groups. Particularly preferred are those compounds where E and E' are carbonyl, where $R^{ix}$ is either alkylene or phenylene, q is a five-membered alkylene group and the integer a is one.

Examples include terephthaloyl bis-caprolactam, adipoyl bis-caprolactam; malonyl bis-pyrrolidinone; succinoyl bispyrrolidinone; glutaroyl bis-piperidone; glutaconoyl bis-piperidone; 2-ethyl-2-phenyl-plutaroyl bis-valerolactam; 2,3-diethylsuccinoyl bis caprolactam; pimeloyl bis-capryllactam; sebacoyl bis-caprolactam phthaloyl bis-piperidone; isophthaloyl bis-dodecanolactam; trimesoyltris-caprolactam; (1,3,5-benzene tricarbonyl tril caprolactam); 1,2,3,5-benzenetetracarbonyl tetrakis-caprolactam; 1,2,3,4-naphthalenetetracarbonyltetrakis-piperidone and 1,4-cyclohexanedicarbonyl biscaprolactam; 1,3-benzene disulfonyl caprolactam; 3-(sulfonyl caprolactam)-benzoyl caprolactam; phosphoryl tris-caprolactam; benzene phosphoryl bis-caprolactam; and dithioterephthaloyl bis-caprolactam.

The amount of polyacyl lactam useful in the preparation of the terpolymers of this invention depends upon the quantities of lactam and block comonomer being used. For preferred polymerizations, it is desirable that the polyacyl lactam be present in an amount from 100 to about 500, preferably from about 100 to about 200, equivalent percent of the polyol. If the polyacyl lactam is present in an amount less than a molecular equivalent amount based on the block comonomer polyol-prepolymer formation occurs, but the subsequent lactam polymerization is very slow. In those preferred polymerization systems where the polyacyl lactam concentration exceeds the amount stoichiometrically equivalent to the block comonomer, the excess can be from 0.01 to about 30 or more mole percent of the lactam monomer. A preferred range is from about 0.1 to about 10 mole percent of the lactam monomer, and more preferably from about 0.2 to about 5 mole percent of the lactam monomer.

The coupling co-catalyst can also include triazines as disclosed in U.S. Pat. No. 4,487,920 hereby incorporated by reference. The triazine co-catalyst/coupling agent can be selected from the group consisting of

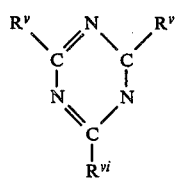

(14)

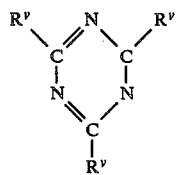

(15)

and mixtures thereof; wherein $R^v$ is a reactive substituent selected, independently at each occurrence, from the group consisting of alkoxy, aryloxy, halo, oximino, imidazolyl and N-lactamyl; and $R^{vi}$ is a monofunctional moiety, inert during polymerization, selected from the group consisting of alkyl, aryl, dialkylamino and diarylamino.

The preferred group of triazine co-catalyst/coupling agents are those of formula (14) having two reactive substituents $R^v$ and one non-reactive substituent $R^{vi}$. The reactive substituent $R^v$ may be alkoxy (from 1-6 carbons), aryloxy (such and phenoxy), halo (chlor, bromo or iodo), oximino (as from 3-10 carbons), imidazolyl, or N-lactamyl. Representative groups such oximino for $R^v$ include cyclohexanone oximino, methyl ethyl ketone oxime and benzaldehyde oximino, attached to the triazine ring through the oxygen as in:

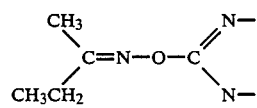

When $R^v$ is imidazolyl, the corresponding structure would be

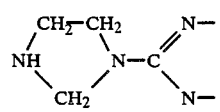

Preferred $R^v$ substituents are chloro, bromo, caprolactamly and phenoxy, with chloro and caprolactamyl being most preferred. The non-reactive substituent $R^{vi}$ may be alkyl, aryl, dialkylamino or diarylamino with dialkylamino being preferred. Each alkyl may be of 1-6 carbons, and is preferably methyl or ethyl in the dialkylamino (dimethylamino, diethylamino or methylethylamino).

The coupling co-catalyst can also be a polyisocyanate, preferably a di-isocyanate having the formula $O{=}C{=}N-R^{vii}-N{=}C{=}O$ where $R^{vii}$ is a divalent hydrocarbon group. $R^{vii}$ can include aliphatic or aromatic groups. Preferably $R^{vii}$ is $(CH_2)_s$, where s is preferably from 2 to 12, or an aryl group such as a phenolic group including substituted phenols and bisphenols. The isocyanate immediately forms a carbamoyl group upon being mixed with caprolactam.

Alternately, a polycarbamoyl group can be used as the coupling co-catalysts. This compound has the general formula

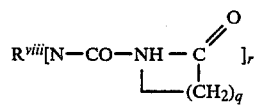

where
r is from 2-6, and
$R^{viii}$ is an alkylene or arylene groups.

The lactam polymerization catalyst useful herein includes the class of compounds commonly recognized as suitable basic catalysts for the anhydrous polymerization of lactams. In general, all alkali or alkaline earth metals are effective catalysts either in the metallic form or in the form of hydrides, halohydrides, alkylhalides, oxides, hydroxides, carbonates, and the like.

The catalyst can be selected from the group consisting of alkali metals, alkali metal hydrides, alkyl alkaline earth monohalides and aryl alkaline earth monohalides or a lactam salt of the formula:

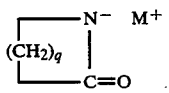

where M+ is an alkali metal cation or alkaline earth metal monohalide.

Also useful are a number of organometallic compounds of the metals mentioned above such as metal alkyls, metal phenyls, metal amides, and the like. Examples include sodium hydride, potassium hydroxide, lithium oxide ethyl magnesium bromide, calcium fluorohydride, strontium carbonate, barium hydroxide, methyl sodium butyl lithium, potassium phenyl, diphenyl barium, sodium amide and magnesium diethyl. All of the foregoing compounds react with the lactam monomer to form the metal lactam, which is the active catalytic agent in the lactam polymerization mechanism. The metal lactam catalyst can therefore be formed in situ by reaction of one of the foregoing metal or metal compounds with lactam monomer in the polymerization medium or by prior reaction of the metal or metal compound with a stoichiometric quantity of lactam monomer. Examples of metal lactam catalysts include sodium caprolactam, magnesium caprolactam, bromomagnesium pyrrolidinone, chlorocalcium caprolactam and the like. Catalyst concentrations can range from a fraction of one mole percent to 10 or more mole percent of the lactam monomer to be polymerized with the preferred catalyst concentration being from 0.1 to 10, more preferably 0.5 to 5 mole percent based on the lactam.

The copolymer of the present invention is a block copolymer comprising the aforementioned components having a number of different structures depending upon the process conditions and the relative proportions of ingredients used in the reaction system. Polymers can be prepared having relatively small segments of lactam units joined to similarly short segments of the reactive block co-oligomer units through the coupling co-catalyst linkage described above. Or large segments of one polymeric component can be combined with a larger number of comparatively small segments of another polymeric units, which small segments are joined to one another through the coupling co-catalyst linkage as well as to the other type of polymeric component. Or segments of varying sizes of both the lactam and the block co-oligomer polymeric units can be combined through the coupling co-catalyst components to form a highly random terpolymer. Another form of polymer within the scope of this invention are block polymers, where moderately large size blocks or segments of the lactam and reactive block oligomer polymeric units are positioned alternately in the polymer chain and joined through the co-catalyst group described above.

Following is a general formula (16) illustrating the copolymer of the present invention.

[F] is derived from a co-catalyst such as indicated by formulas (12), (13), (14) or other known co-catalysts;
[G] is derived from the block co-oligomer such as indicated by formulas (1), (2), or (3).

The types of co-catalyst/lactam/block co-oligomer linkages and reaction mechanisms are of the type expected depending upon the reactive polyether or polysulfide. Postulated reaction mechanisms, and linkages are summarized in U.S. Pat. No. 4,031,164 and U.S. Pat. No. 4,487,920. While the applicants do not wish to be tied to a particular theory of reaciton mechanism, following is summary of typical linkages which can be expected in the copolymer of formula (15). The terminal linkages are expected to be ethyl lactams.

Where the co-catalyst is an acyl group linkage to a hydroxy terminated co-oligomer is an ester

linkage to an amine terminated co-oligomer is an amide

and linkage to a thio terminated co-oligomer is thioester

The acyl-lactam linkage is an amide. Where the co-catalyst is an isocyanate, the linkage to a hydroxy terminated co-oligomer is an amide, the linkage to an amine terminated co-oligomer is a urea

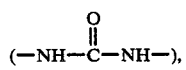

and linkage to a thio terminated co-oligomer is a thio urethane

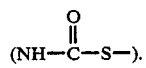

The isocyanate (carbamoyl) linkage to the lactam is a urea. The triazine linkages which are expected are of the type disclosed in U.S. Pat. No. 4,487,920.

In general, there is from 0.5 to 5 weight percent based on the weight of the total copolymer of the moiety contributed by the coupling co-catalyst. There is about from 10 to 90 percent of the lactam moiety and from about 5 to 90 percent of the block co-oligomer moiety.

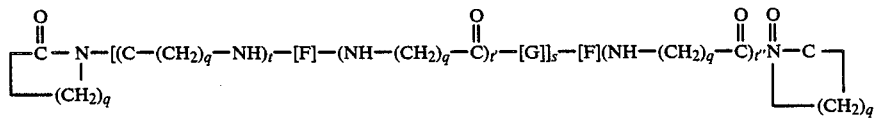

where:
q is defined as above;
t, t′, t″, and s are equal to one or more;

More preferably there is from 10 to 50 percent of the block co-oligomer moiety and most preferably there is only from 5 to 20 percent of the block co-oligomer moiety. Correspondingly, there is preferably from 50 to 95 percent of the lactam moiety and most preferably from 70 to 90 percent of the lactam moiety.

The lactam, block co-oligomer, co-catalyst coupling compound copolymer has many uses as indicated in the cited patents. The preferred use of the block comonomer and the copolymer is to reaction injection mold articles. As will be seen from the following Examples, the use of the block comonomer imparts improved impact resistance with reduced moisture absorption to a composition formed using the lactam-block comonomer copolymers of the present invention.

Copolymers containing moieties such as polyether polyols, lactam and co-catalyst in copolymers are known as indicated in the cited references. Impact resistance has improved but a fast rate of moisture absorption with such copolymers continues to be a problem. When moisture is absorbed the dimensions of the final product can change. Therefore, when the final product is exposed to water or highly humid conditions, more than 2 percent moisture is absorbed and as much as 10 percent by weight percent moisture is absorbed resulting in greater than 2 percent dimensional changes after immersion in water for 20 days has been measured. A difficulty found when using polybutadiene in the form of polybutadiene diol, for example, has been that this type of material has poor compatibility with polycaprolactam. As a result, there is a tendency for the reaction to proceed initially but as the caprolactam polymerizes the compatibility becomes poorer and caprolactam homopolymer forms while the polybutadiene diol remains relatively unreactive and actually phase separates. This results in poor tensile and impact properties.

According to the present invention, the co-oligomer has as little as 0.20 percent dimensional after 20 days of immersion in water. The dimensional stability is particularly important when the composition is used to form electrical parts and sheet-like parts such as automobile fenders and the like. The use of the block co-oligomer of the present invention has been found to result in improved impact resistance resulting from the rubbery segment while at the same time having improved moisture pickup resistance thereby enabling parts made from the copolymer to have improved dimensional stability. Where the rubbery segment is reacted with a polyol, amine, or epoxy terminated polyether or thio terminated polysulfide it results in the co-oligomer which forms improved compatibility with lactams such as polycaprolactam. The co-oligomer, such as polyether-polybutadiene block co-oligomers reacts to conversion levels of greater than 80% and preferably 90 to 100% under conditions of the anionic polymerization of lactams.

The present invention includes a process to form the reaction product of a polycarboxylic acid of they type having formulas (4), (5), and (6) and the polyol, or amine or epoxy terminated polyether, or thio terminated polysulfide of the type having formulas (8), (9), (10) and (11).

The process is preferably conducted under a vacuum without the necessity of using a solvent. The vacuum is approximately 1 to 150, preferably 1 to 50, and most preferably 1 to 10 mm of mercury. The reaction is typically conducted at from 100 to 180, preferably from 130 to 180 and most preferably 140° to 165° C. The reaction should be conducted at a high enough temperature so that the caprolactam and the polyol or amine or epoxy terminated polyether, or thio terminated polysulfide are liquid. The reaction may be conducted continuously or batch with the batch type reaction being most preferred. Typically in a reaction, the ratio of the polycarboxylic acid to polyol or amine or epoxy terminated polyethers, or thio terminated polysulfide can be varied to form the desired co-oligomer composition. The reaction is conducted until it is preferably 50% completed, more preferably 75% and most preferably greater or equal to 85% completed. The completion of reaction is measured as based on the percentage of acid groups esterified by carboxyl titration. An inert gas such as nitrogen or argon can be used above the reacting mixture and alternately bubbled through the reacting mixture to promote stirring. Other known ways to stir the reaction such as using the stirred reactor can be used. Esterification catalysts are preferably used. The preferred class of catalysts are alkyl titanates, and alkyl and aryl sulfonic acids. Preferred catalysts included tetra[o-butyl] titanate, tetra[n-butyl] titanate, and tetra[propyl] titanate, methane sulfonic acid and paratoluene sulfonic acids.

The process according to the present invention results in a block co-oligomer which can be used in a process to polymerize the above-described lactam-block co-oligomer copolymers.

Polymerization temperatures can vary from the melting point of the lactam or less up to the melting point of the resultant polymer or more. Depending upon the particular ingredients being used, this can encompass a range from about 70° to 230° C. Preferred polymerization temperatures are from about 90° to about 190° C., and more preferably from about 120° C. to about 180° C. for caprolactam terpolymers. Even more preferred is a polymerization where the temperature is increased during the polymerization from an initial temperature of from about 70° to about 100° C. at the beginning of the polymerization to a final temperature of about 150° to 180° C. Such a technique produces a rapid polymerization of a copolymer having high strength and modulus.

Times required for complete polymerization will vary considerably depending upon polymerization temperatures and the specific ingredients used in the polymerization system. Total polymerization time can be as little as 30 seconds or less, preferably from 1 to 10 minutes, and can be extended to any duration up to several days or more. Generally, polymerization times of from 1 to 10 minutes are preferred for most polymerization systems.

In embodiments of the present invention, amine terminated ethers can be used in place of hydroxy-terminated ethers. Where this is the case, the amine terminated ethers can be polyamines containing two or more primary or secondary amine groups per molecule. It has been found that amine terminated groups react most readily when isocyanate type coupling co-catalysts are used. Alternately, other coupling co-catalysts can be used but an initial reacting step to react them with acyl type coupling co-catalysts may be required.

The lactam and block co-oligomer can be present in any relative proportions ranging up to 99 parts of either component to 1 part of the other. Preferred ratios of the two polymer-forming materials depend upon the end use to which the finished polymer is to be put. For end use applications requiring strong rigid materials, the lactam content of the polymerizable medium should be relatively high such as 60 to 90% or more lactam. For other applications where elastomeric properties such as high elongation or where water absorption is tolerable or desirable, the relative proportions of the two monomers can be reversed so that the polymerizable medium will contain 60 or 80 or 90% or more of the block comonomer compound. Polymers containing greater quantities of lactam than block comonomer are preferred a for a great many uses because of the advantageous combinations of properties achieved by such polymers.

In addition to the three principal monomeric constituents which together produce the copolymers of this invention, other polymerizable monomers can also be used to prepare polymers having four or more polymerizable constituents. Vinyl compounds and other monomers could be chosen which could be polymerized directly directly into a linear polymer chain. The quantity of such additional monomers could be very large even as great as 50% or more of the total polymerizable consituents but preferably is limited to quantities of 25% or less of the total monomer content.

Several examples are set forth below to illustrate the nature of the invention and the manner of carrying it out. However, the invention should not be considered as being limited to the details thereof. All parts are by weight unless otherwise indicated. Mn is number average molecular weight and Mw is weight average molecular weight.

In the following Examples, block co-oligomers of the present invention have been produced. The block co-oligomers were made based on the following materials. Poly-G ® reactive diols produced by Olin Chemicals, of Stamford, Connecticut, are described in Olin Product Data Sheet entititled "Typical Properties of Olin Urethane Chemicals", 1983. These materials are poly(-propylene oxide) capped with ethylene oxide to result in reactive diprimary diol structures. Poly-G-55-112 is described as having an average molecular weight of 1,000 an average hydroxyl number (mg KOH/g) of 112 and acid number, maximum acid number of 0.02 mg KOH/g, a maximum water content of 0.02 percent, an average pH of 6.0, a color, APHA, maximum of 20, a typical viscosity at 25° C. (cs) of 86, a specific gravity at 25° C. of 1.056 resulting in 8.79 lbs/gal. Poly-G 55-173 is described as having an average molecular weight of 650, an average hydroxyl number (mg KOH/g) of 173, a maximum acid number of 0.05 mg KOH/g, a maximum water content of 0.03 percent, an average pH of 6.8, a color, APHA, maximum of 30, a typical viscosity at 25° C. of 109 (cs), specific gravity of 1.058 resulting in 8.81 lbs/gal.

Another polyol used was Union Carbide's Niax PPG1025, a disecondary diol of 1000 molecular weight. Also used were poly(tetramethylene ether) glycols of number average molecular weight 1000 (Polymeg ®1000 from Quaker Oates) and number average molecular weight 650 (Teracol 650 from DuPont).

In producing the block co-oligomer, the catalyst used was tetra orthobutyl titanate $((CH_3CH_2CH_2CH_2-O-)_4Ti)$ (TBT) produced by Kodak.

The rubbery moiety used were various reactive butadiene based polymers produced as HYCAR ® Reactive Liquid Polymers by B. F. Goodrich and described in *HYCAR ® Reactive Liquid Polymers*, Product Data Brochure by B. F. Goodrich, 1983. These materials are polybutadiene based polymers which have carboxyl termination. HYCAR ® CTB 2000×162 is described as having a carboxyl content acid number of 25, EPHR (gram equivalents of acid per 100 grams of the rubber) of 0.045, a Brookfield Viscosity of 60,000 mPa.s or cP at 27° C., a specific gravity at 25° C. of 0.924, a functionality of 1.9, and a number average molecular weight of 4,200. HYCAR CTB 2000×165 is described as having a carboxyl content acid number of 28, EPHR of 0.050, a Brookfield Viscosity of 35,000 mPa.s or cP at 27° C., a specific gravity at 25° of 0.907, a functionality of 1.9, and a number average molecular weight of 3,800. HYCAR CTB 2000×167 has a number average molelcular weight of 4545 and in EPHR of 0.44. HYCAR 1300×8 has an acrylonitrile content of 18%, a carboxyl content acid number of 29, and an EPHR of 0.052, a Brookfield Viscosity of 135,000 mPa.s at cP of 27° C., a specific gravity at 25° C. of 0.948, a functionality of 1.8 and a number average molecular weight of 3,600.

Preparation Of Reactive, Elastomeric, Block Co-Oligomers

EXAMPLE 1

Into a 10 gallon, Pfaudler glass lined, stirred reactor was charged 33.5 lbs of Hycar CTB 2000×162 ($-CO_2H$, EPHR=0.044), 16.3 lbs of poly G-55-112 (Olin) and 92.1 grams of TBT. The reaction mixture was stirred and heated with 125 psig steam sent into the reactor jacket with a gradual vacuum of 15 mm Hg down to 2 mm Hg was applied. When the temperature reached 120° C. in about 30 minutes, the reaction began to occur as evidenced by the condensate formed on the coils of water cooled condenser. In another 30 minutes, the reactor temperature reached and leveled off at 166° to 168° C., while the vacuum reached an equilibrium state of about 2 mm Hg. The reactor was maintained at this temperature and vacuum for 6½ hours. After this total reaction time of 7 hours, the product was withdrawn into containers. The yield was 47.8 lbs of a random block co-oligomer of polybutadiene and polypropylene oxide) or 96%. The results and the product properties are summarized in Table 1.

EXAMPLE 2

Into the same reactor was charged 35.8 lbs of Hycar CTB 2000×162, 17.8 lbs of Poly G-55-112 and 100.2 grams of TBT. The reaction was essentially carried out as described in Example 1 except that the total reaction time was reduced to 5 hours. The yield was 52.7 lbs or 98%. Results are summarized on see Table 1.

EXAMPLE 3

The above example was repeated with 32.3 lbs of Hycar CTB 2000×162, 15.3 lbs of poly G-55-112 and 87 grams of TBT. The reaction time at 166° C. and 2 mm Hg was 5½ hours. The product was discharged at the end of this period. The yield was 47.2 lbs or 98.7% collected. Results are summarized on Table 1.

EXAMPLE 4

Into the same 10 gal glass lined Pfaulder reactor were added 34.0 lb or Hycar CTB 2000×167 Example 1, 14.2 lb of Q.O. Chemicals Polymeg 1000 and 89.8 gms. of TBT. The reactor was swept with $N_2$ briefly, the agitator turned on and the vacuum applied. The reactor was heated intially with 85 psig steam for 20 mins., then with 129 psig steam for 5½ hours. The vacuum varied from 10 mm Hg (initially) to 1.5 mm Hg at the end of the reaction. The condensate was seen first at 137° C. and 12 mm Hg. The product was then discharged; 45.8 lb were collected for a 94% yield. Results are summarized on Table 1.

EXAMPLE 5

Into the same reactor were added 34.6 lb of Hycar CTBN type 1300×8 a butadiene-acrylonitrile copolymer containing 18% by weight acrylonitrile units and having a carboxyl content of 0.054 EPHR, 19.5 lb of Q.O. Chemicals Polymeg 1000, 1.1 lb of Poly 55-112 (both primary polyols having a Mn of 1000) and 127 gm of TBT. The agitator was started and the reactor was put under vacuum and heated with 90 psig steam intially for 30 mins., then with 130 psig steam for the duration of the reaction. After 6 hours at <10 mm Hg and temperatures of 145° to 170° C. (mostly 170° C.), the reaction was stopped and the material was discharged into 1 gal. cans. 54.9 lb was collected for a yield of 99%. Results are summarized in Table 1.

EXAMPLE 6

Into the 10 gallon reactor was charged 34.7 lbs of Hycar CTBN 1300×8 butadiene-acrylonitrile (18% by weight) copolymer (EPHR=0.054, Mn-3704), 20.7 lbs of Niax PPG-1025 a disecondary polypropylene glycol, and 127 gms of TBT catalyst. Example 6 was exactly the same as Example 5 with the exception of the polyol. Example 5 used a primary polyol whereas Example 6 used a secondry polyol. Twenty minutes into the reaction, when the materials were approximately 100° C. and under 10 to 15 mm Hg vacuum, the contents "burped" into the condenser column. The steam heating was stopped and most of the burped material was pushed back or poured back into the reactor. Some of this material was titrated; approximately 15% of the carboxyl groups had reacted. The mixture was again heated and put under vacuum, allowing the reaction to continue. After approximately one hour, no further water condensation was seen. The material was maintained at 165° to 170° C. for 5 hours, and a sample was taken. The sample was titrated and it showed that approximately 55% of the carboxyl groups were reacted. The mixture was kept under 5 psig $N_2$ blanket and at 120° C. overnight. The next morning, it was reheated and put back under vacuum (down to 1 to 2 mm Hg). No condensate (water or butanol) was seen for the 6 hours that is was "cooking" at 165° C. to 170° C. (130 psig steam heat). When another sample was titrated, a dark brown material (which was not as viscous as any of the previous materials made in Examples 1-4) assayed as 55% reacted carboxyl groups. Evidently, no reaction had taken place on the second day. A total of 55.4 lbs was collected. Results are summarized in Table 1.

EXAMPLE 7

In this experiment, 33.9 lbs of Hycar CTB 2000×162 (EPHR=0.044 Mn 4545), 10.7 lbs of Teracol 650 and 117 grams of TBT were added to the reactor. The mixture was heated under vacuum as in Example 1. After approximately 6 hours, the mixture was discharged, with an analyzed carboxyl esterification of 95%. Results are summarized in Table 1.

EXAMPLE 8

In this experiment, 34.5 lbs of Hycar CTBN 1300×8 (EPHR=0.054, Mn 3703), 13.4 lbs of Teracol 650 and 117.5 grams of TBT were charged. This was identical to Example 7 except that HYCAR CTBN was used instead to HYCAR CTB. Results are summarized in Table 1.

EXAMPLE 9

In this experiment 35.7 lbs of Hycar CTBN 1300×3 (EPHR=0.054), 21.2 lbs of Polyol 55-112 and 120-8 grams TBT were reacted as before. The reaction completion was 86% after 5½ hours, when the material was discharged. Results are summarized in Table 1.

In Examples 1-9, all the esters were formed without the use of a solvent as a drying/water stripping agent. The product contains no volatile solvents which are difficult to remove.

In Table 1 the % conversion is based on measured of carboxyl groups reacted by titration with alcoholic KOH according BF Goodrich Procedure IIII set forth in the Bulletin, Hycar®, Reactive Liquid Polymer PB-21 (5/83) hereby incorporated by reference.

TABLE 1

| EXAMPLE # | HYCAR TYPE (Mn) | POLYOL TYPE (Mn) | % CONVERSION | Weight Ratio Polybutadiene/ Polyol |
|---|---|---|---|---|
| 1 | CTB 2000 × 162 (4545) | Poly G 55-112 (1000) | 94 | 2.0 |
| 2 | CTB 2000 × 162 (4545) | Poly G 55-112 (1000) | 87.1 | 2.0 |
| 3 | CTB 2000 × 162 (4545) | Poly G 55-112 (1000) | 92 | 2.1 |
| 4 | CTB 2000 × 167 (4545) | Polymeg 1000 (1000) | 94 | 2.4 |
| 5 | CTB 1300 × 8 (3700) | and Poly G 55-112 | >99 | 1.7 |
| 6 | CTB 1300 × 8 (3700) | Niax PPG-1025 | 55 | 1.7 |
| 7 | CTB 2000 × 162 (4545) | Teracol 650 (650) | 95 | 3.2 |
| 8 | CTBN 1300 × 8 | Teracol 650 (650) | 98.4 | 2.6 |
| 9 | CTBN 1300 × 8 | Poly G-55-112 | >86 | 1.7 |

| EXAMPLE # | $Mw^a \times 10^4$ | $Mn^a \times 10^4$ | $Mw/Mn^a$ | Viscosity (cp, 100° C.) |
|---|---|---|---|---|
| 1 | 3 | 1.5 | 2 | 13,000 |
| 2 | 2.67 | 1.3 | 2.04 | 5,200 |
| 3 | 3.1 | 1.59 | 1.94 | 9,800 |
| 4 | 4.4 | 1.8 | 2.4 | 12,000 |
| 5 | 4 | 1.8 | 2.2 | 17,800 |
| 6 | — | — | — | — |
| 7 | 3.7 | 1.8 | 2.1 | — |
| 8 | 4.3 | 1.8 | 2.4 | 18,000 |
| 9 | — | — | — | — |

$^a$Gel Permeation Chromatography; and
$^b$Brookfield Viscosity

EXAMPLE 10

7803 Grams of Hycar CTB 2000×167 (Mn 4545) and 3776.6 grams PPG 1025 were esterified with 23.3 grams of TBT to produce a block co-oligomer polyol with secondary hydroxyl group termination.

EXAMPLE 11

127.2 Grams of Nisso PB C1000(1,2-polybutadiene) and 252.4 grams of Polyol 55-112 were esterified with 1.73 grams of TBT. Titration for hydroxyl groups showed 0.993 meq/gr of hydroxyl groups.

EXAMPLE 12

100 Grams of Nisso PB CI 1000(hydrogenated 1,2-polybutadiene) and 200 grams of Polyol 55-112 were esterified with 1.36 grams of TBT. Titration for hydroxyl groups showed 1.046 meg/gr. of hydroxyl groups.

EXAMPLE 13

201.3 Grams of Hycar CTB 2000×167 (MW 4545) and 194.9 grams of Jeffamine D2000(amine-terminated polypropylene oxide) were reacted together for seven hours at 172° C. to form a block comonomer co-oligomer with amine end group.

Lactam Block Copolymers

The lactam block copolymers described in this invention were obtained by fast, anionic copolymerization of the reactive, elastomeric, block co-oligomers of Examples 1–13, with caprolactam employing bromomagnesium caprolactam as catalyst and terephthaloyl bis caprolactam as co-catalyst coupling agent. The polymerizations were conducted via a reaction injection molding process (RIM) using a commercial, high temperature 2-stream RIM machine (Battenfeld).

The equipment used in this invention was a modified Battenfeld RIM machine consisting of a high temperature mixer-dispenser unit with two 10 gallon stainless steel tanks. The two material streams are circulated by means of hydraulically driven lance cylinders through the mixing head in a high pressure circulation loop. The mixer-dispersing unit operates as a pulse function because of the lance cylinders. The 10 gal mixing tanks (A and B) are oil heated with the remainder of the machine electrical heating. All of the machine in contact with the material streams is stainless steel with the exceptions of the steel mixing head, the chrome plated lance cylinders and the TEFLON lined flexible hoses. The machine is complete with agitators, pressure transducers, thermocouples throughout the machine, and entry ports for addition of materials or application of vacuum or pressure.

Shot size is limited by the size of the lance cylinders. This machine is capable of making and 11 lb unfilled part or a 15 lb filled (25%) part. Fill time is limited by the cylinder speed and material line diameters. Minimum fill time is about 2 seconds/lb on this machine.

The mixing head operates as both part of the circulation loop and the zone of mixing of the two streams. Upon realigning the plates in the mixing head and retracting a cleanout rod, by activating two hydraulic cylinders, the RIM machine goes from circulation to injection mode. The two material streams are mixed under pressure and shot into a mold. Mixing pressure is controlled by changing the minimum orifice size in the mixing head via a pair of adjustable conical impingement screws.

Controls of the Battenfeld RIM machine consist of a number of temperature, pressure and flow control readouts, including 9 temperature control zones on each side and adjustable calibrated flow controls. Microprocessor controlled programming determines the event sequencing on the machine.

The clamp used to hold the mold is a Battenfeld WK 60 with 20 tons clamping pressure overall. The platens are 24"×24" with 90° tilt and booking capabilities.

EXAMPLE 14(a)

This example illustrates the preparation of lactam block copolymer molded parts directly from the reaction injection molding process. Both A & B tanks of the RIM machine as well as the circulating lines were preheated to 100° C. Tank "A" was charged with 40 lbs of dry caprolactam (molten), and 10 lbs of 24% bromomagnesium caprolactam concentrates in caprolactam (CMB), added as a granular solid with good stirring under argon. (The concentrate was prepared by reaction of ethyl magnesium bromide and caprolactam, degassing and flaking it as a solid). The contents of "A" tank were stirred to dissolve the catalyst and then circulated through the machine while degassing continuously under vacuum (30–100 mm Hg) for 2 hours. The "B" tank was charged with 40 lbs of molten caprolactam 2.67 lbs of terephthaloylbiscaprolactam (TBC) and 10.7 lbs of the block co-oligomer of Example 1. The contents were stirred at 100° C. under argon until complete solution occurred while degassing under vacuum for 30 minutes. The process operated with a shot at a mix ratio of 1:1, throughput rate of 14 lbs/min of each stream, mixing pressure of 300 psi, and fill time of 5 seconds, into a preheated (160° C.) mold. The mold was a flat plaque of 2'×2'×⅛" dimensions. The cure was typically 60 seconds and the part was demolded within 2 minutes. The properties are listed in Table 2. This composition consisted of 10% block co-oligomer content, 87.6% caprolactam, and 2.4% co-catalyst.

EXAMPLE 14(b)

The above procedure of Example 14(a) was similarly followed with the following material changes. A tank: caprolactam=40.0 parts (by weight). 24% CMB=10 parts; B tank: caprolactam=39.6 parts; TBC=2.4 parts; Block co-oligomer (Ex. 1)=8 parts. This final copolymer contained 8% block co-oligomer. The remainder is substantially polycaprolactam, since the co-catalyst is a caprolactam salt.

EXAMPLE 14(c)

The previous example was repeated with the following A & B tank charges to obtain a copolymer containing 12.5% block co-oligomer units.
A tank: caprolactam=40 parts; 24% CMB=10 parts.
B tank: caprolactam=34.9 parts; TBC=2.65 parts; block co-oligomer (Ex. 1)=12.5 parts.

EXAMPLE 14 (d)

The previous example was repeated with the following A & B tank charges to obtain a copolymer having 15% block co-oligomer units.
A tank: caprolactam=40 parts; 24% CMB=10 parts.
B tank: caprolactam=32.2 parts; TBC=2.7 parts; block co-oligomer (Ex. 1)=15 parts.

The results of Examples 14(a)–(d) are summarized in Table 2. The copolymer formed contains the indicated amount of co-oligomer with the balance being polycaprolactam. Physical properties were tested according to the following procedures: Tensile Strength, ASTM-D 638; Flexural properties, ASTM-D 790; Notched Izod, ASTM-D 356A; and heat sag ASTM-D 3769. Dimensional Growth was measured based on dimensional change upon immersion for 20 days in water at 25° C. for ⅛ inch thick specimen. Dynamic modulus was measured according to the procedure set forth in Murayama, Material Science Monographs, 1, *Dynamic Mechanical Analysis of Polymeric Material*.

TABLE 2

| | EXAMPLE # | | | |
|---|---|---|---|---|
| | 14 (b) | 14 (a) | 14 (c) | 14 (d) |
| Block co-oligomer type | Ex. 1 | Ex. 1 | Ex. 1 | Ex. 1 |
| % Block co-oligomer | 8 | 10 | 12.5 | 15 |
| Notched Izod (ft lbs/In, 23° C.) | 2.5 | 3.5–8 | 10–18 | >18 |

TABLE 2-continued

| | EXAMPLE # | | | |
|---|---|---|---|---|
| | 14 (b) | 14 (a) | 14 (c) | 14 (d) |
| Flex. Modulus (PSI × $10^3$) | 380 | 350–390 | 300 | 250 |
| Tensile Strength (PSI × $10^3$) | 9 | 9.5 | 7.4 | 6.6 |
| Elongation to Break (%) | 28 | 30–70 | 160 | 166 |
| Cantilever Heat Sag (inches) (160° C., 1 hr., 6″ overhang) | 0.12 | 0.12–0.2 | 0.5 | 0.6 |
| Dynamic modulus ratio | | | | |
| $E'_{-30° C.}/E'_{70° C.}$ | 2.45 | 2.5 | 2.57 | 2.88 |
| $E'_{25° C.}/E'_{160° C.}$ | 5 | 5 | 5.75 | 5.6 |
| Dimensional Growth in water (23° C.) % | | | | |
| 5 days | 0.1 | 0.25 | 0.4 | 0.7 |
| 10 days | 0.12 | 0.32 | 0.6 | 1.08 |
| 15 days | 0.3 | 0.8 | 1.4 | 1.85 |
| 20 days | 0.38 | 1.13 | 1.69 | 2.0 |

EXAMPLE 15(a)

This example is similar to example 14(a) except that block co-oligomers from Example 8 were used. All other components are identical. The final copolymer of this composition contained 7.5% of the co-oligomer (of Example 8).

EXAMPLE 15(b) & (c)

Examples 15(b) and (c) contained 12.5 and 15% of the block co-oligomer (of Example 8) respectively. The properties are listed in Table 3.

In Example 15, the copolymer formed contains the indicated amount of co-oligomer and the balance is substantially polycaprolactam.

TABLE 3

| | EXAMPLE | | |
|---|---|---|---|
| | 15 (a) | 15 (b) | 15 (c) |
| % Block Co-oligomer | 7.5 | 12.5 | 15 |
| N. I. (ft lbs/In, 23° C.) | 2.2 | 4.1 | 8.4 |
| Flex. Modulus (KSI) | 415 | 350 | 290 |
| % Dimensional Growth in Water | | | |
| 5 days | <0.1 | 0.2 | |
| 10 days | 0.15 | 0.46 | |
| 15 days | 0.2 | 0.87 | |
| 20 days | 0.28 | 1.17 | |

EXAMPLES 16–20

Example 14 was repeated with different block co-oligomers as shown in TABLE 4.

TABLE 4

| Example | Block Co-Oligomer Type | Block Co-Oligomer Content (%) | Notched Izod (ft. lbs/in.) |
|---|---|---|---|
| 16 | Example 2 | 10 | 10.5 |
| 17 | Example 3 | 8 | 4.6 |
| 18 | Example 4 | 10 (insoluble) | — |
| 19 | Example 5 | 7.5 | 2.4 |
| 20 | Example 6 | 12.5 | 3.4 |

COMPARATIVE EXAMPLES 1–4

Several examples were run with conventional polyether diols such as Poly G-5528 (Olin) a reactive polypropylene oxide diol of molecular weight=4,000, and hydroxyterminated poly(butadiene-co-acrylonitrile) (Hycar HTBN) as well as hydroxyterminated polybutadiene from (ARCO Poly BD). All these examples and their properties are listed in Table 5. Comparatives 1 and 2 used Olin's Poly G-5528. Comparative 3 used Hycar HTBN. Comparative 4 used ARCO Poly BD.

TABLE 5

| Comp. | Polyol Content | N. I. (ft lbs/in.) 23° C. | Flex Mod. ($10^3$ psi) |
|---|---|---|---|
| 1 | 0 | 0.8 | 500 |
| 2a | 7.5 | 4 | 370–410 |
| 2b | 10 | 10 to 15 | 290–350 |
| 2c | 12.5 | 15 | 300 |
| 2d | 15 | >18 | 240 |
| 3a | 10 | 1.2 | 385 |
| 3b | 12.5 | 2 | 310 |
| 3c | 15 | 2.1 | 275 |
| 4 | 10 | 0.8 | 405 |

| | Tensile Strength | Break Elongation (%) | Heat Sag (inches) 160° C., 1 hr., 6″ |
|---|---|---|---|
| 1 | 13 | 10–2 | — |
| 2a | 9.5 | 28–50 | 0.15–0.2 |
| 2b | 8 | 28–70 | — |
| 2c | 7.3 | 80–150 | 0.35 |
| 2d | 6.3 | 167 | >0.3 |
| 3a | — | — | |
| 3b | 6.5 | 10 | |
| 3c | — | — | |
| 4 | 9.5 | 5 | |

| | Dimensional growth (%) Days Immersed in Water | | | |
|---|---|---|---|---|
| | 5 | 10 | 15 | 20 |
| 1 | 0.15 | 0.2 | 0.35 | 0.5 |
| 2a | 0.4 | 1.0 | 1.5 | 2.1 |
| 2b | — | — | — | — |
| 2c | 1.4 | 2.35 | 2.55 | 2.6 |
| 2d | 1.5 | 2.5 | 2.7 | 2.7 |
| 3a | 0.25 | 0.5 | 0.65 | 1.0 |
| 3c | 0.2 | 0.6 | 0.8 | 1.18 |

Comparative Examples 5, 6

A physical mixture of B. F. Goodrich's Hycar ® HTB 2000×162 and Olin's poly G-55-112 was used for this experiment. Hycar ® HTB 2000×162 is a hydroxy terminated polybutadiene of about the same molecular weight (Mn 4,500) as the CTB used in the block co-oligomer synthesis. The weight ratio of HTB and Poly G-55-112 in the physical mixture was kept at 2/1 about the same as the ratio of polybutadiene and polyether segments in block co-oligomers of Example 1.

| Comp. Example | Total % HTB + Poly G-55-112 (2:1) | Notched Izod (ft lbs/in) |
|---|---|---|
| 5 | 10 | 0.9 |
| 6 | 15 | 0.9 |

The polymerization charge contained on the catalyst side 2.4% CMB, and on the co-catalyst side 2.6% TBC when the polyol mixture was 10% and 2.8% TBC when in the polyol content 15%. Phase separation of the HTB was observed under an optical microscope.

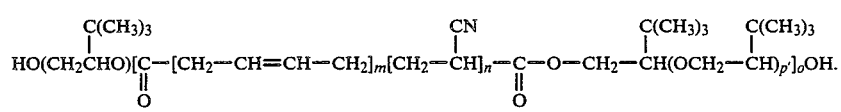

What is claimed:

1. An improved copolymer comprising lactam monomers, and a coupling co-catalyst compound, wherein the improvement is that the copolymer further comprises a block co-oligomer selected from the group consisting of:

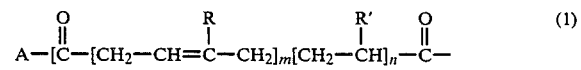

(1)

-continued

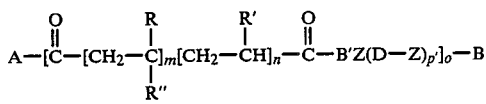

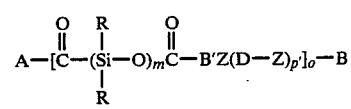

where
A is selected from HD—(Z—D)—; and H$_2$N(Z—O)$_p$—;
B is selected from —DH, and —NH$_2$;
B' is selected from —D—, and —NH—;
D is selected from —O, and —S;
Z is a divalent group;
R is selected from —H, —CH$_3$ and —Cl, and a combination thereof;
R' is selected from —CN, —H, a halogen, —CH=CH$_2$, and a combination thereof;
R" is selected from —CH=CH$_2$, —CH$_3$, and —C$_2$H$_5$ and a combination thereof;
m is greater than 20;
n is greater or equal to 0 and less than m;
o is greater or equal to 1; and
p and p' are greater or equal to 5.

2. The block co-oligomer as recited in claim 1 wherein R is H, and n is 0.

3. The block co-oligomer as recited in claim 1 wherein R is —H, D is —O, and R' is selected from —H and —CN.

4. The block co-oligomer as recited in claim 1 wherein D is —O.

5. The block co-oligomer as recited in claim 1 wherein Z is selected from a hydrocarbon group, a substituted hydrocarbon group, and an acetylated hydrocarbon group.

6. The block co-oligomer as recited in claim 5 wherein Z is selected from —CH$_2$—CH$_2$—, —(CH$_2$)—$_4$, —(CH$_2$)$_6$—, (CF$_2$—CFX); and —CH$_2$—CR"'H—, where R"' is selected from an alkyl group having 1 to 4 carbon atoms, —CH$_2$Cl, and

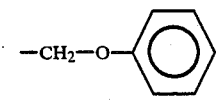

and X is selected from —H, —F, —CF$_3$, or Cl.

7. A terpolymer having the formula:

t, t', t", and s are equal to one or more;
[F] is derived from a coupling co-catalyst; and
[G] is derived from the block co-oligomer selected from the group consisting of:

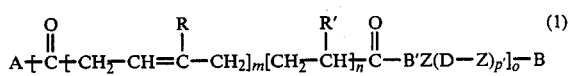

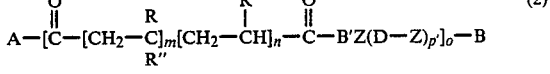

and

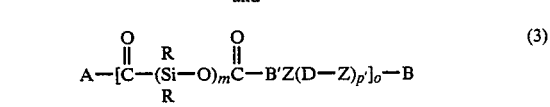

where
A is selected from HD—(Z—D)—$_p$ and H$_2$N(Z—O)—$_p$;
B is selected from —DH, and —NH$_2$;
B' is selected from —D— and —NH—;
D is selected from —O, and —S;
Z is a divalent group;
R is selected from —H, —CH$_3$ and —Cl, and a combination thereof;
R' is selected from —CN, —H, a halogen, —CH=CH$_2$ and a combination thereof;
R" is selected from —CH=CH$_2$, —CH$_3$, and —C$_2$H$_5$ and a combination thereof;
m is greater than 20;
n is greater or equal to 0 and less than m;
o is greater or equal to 1; and
p and p' are greater or equal to 5.

8. An improved copolymer comprising lactam monomers, and a coupling co-catalyst compound, wherein the improvement is that the copolymer further comprises a block co-oligomer having the formula:

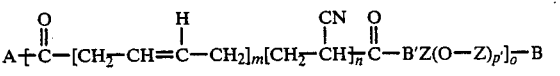

and wherein
A is selected from HO(Z—O)—; and H$_2$N(Z—O)$_p$;
B is selected from —OH; and —NH$_2$;
B' is selected from —O—; and —NH—;
Z is selected from —CH$_2$—CH$_2$—; —(CH$_2$)$_4$; and —CH$_2$—CR"'H— where R"' is selected from an alkyl group having 1 to 4 atoms;
m is greater than 20;
n is greater or equal to 0 and less than m;
o is greater or equal to 1; and

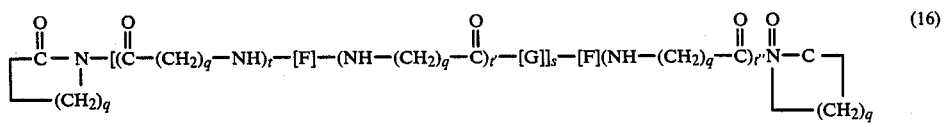

where:
q is from 3 to 12;

p' is greater or equal to 5.

9. The block co-oligomer of claim 8 having the formula